United States Patent [19]
Waldschmitt

[11] Patent Number: 5,624,143
[45] Date of Patent: Apr. 29, 1997

[54] DROP DOWN BUMPER

[76] Inventor: Tom Waldschmitt, 2509 NW. 3rd, Ankeny, Iowa 50021

[21] Appl. No.: 441,345

[22] Filed: May 15, 1995

[51] Int. Cl.$^6$ ............................................... B60R 19/48
[52] U.S. Cl. ........................... 293/118; 280/43.1; 293/125; 293/131; 414/498
[58] Field of Search ........................... 293/17, 102, 118, 293/119, 125, 131; 296/35.3; 280/43.1, 43.24; 414/498

[56] References Cited

U.S. PATENT DOCUMENTS

| | | | |
|---|---|---|---|
| 4,147,266 | 4/1979 | Corompt | 414/498 X |
| 4,514,002 | 4/1985 | McIntosh | 293/118 |
| 4,815,760 | 3/1989 | Dooley | 280/43.24 |
| 4,988,258 | 1/1991 | Lutz et al. | 414/498 X |
| 5,082,417 | 1/1992 | Vlaanderen | 414/498 |
| 5,429,472 | 7/1995 | Dahl | 280/43.24 X |

Primary Examiner—David M. Mitchell
Assistant Examiner—Kia M. Robinson
Attorney, Agent, or Firm—Kent A. Herink; Brian J. Laurenzo

[57] ABSTRACT

A drop down bumper suitable for attachment to a frame of a transportable container or to a truck. The drop down bumper is equipped with loading rollers and is movable between a folded position and an extended position. When the drop down bumper is in the extended position it serves as a conventional rear bumper to help prevent cars and other small vehicles from riding under the rear of the truck, or container loaded on a truck. When the drop down bumper is in the folded position it allows access to the rear portions of the truck, and provides rolling support for the transportable container when the transportable container is being loaded and unloaded. The drop down bumper comprises an impact protection bar, attached loading rollers, and a foldable linkage connecting the impact protection bar with the frame.

20 Claims, 4 Drawing Sheets

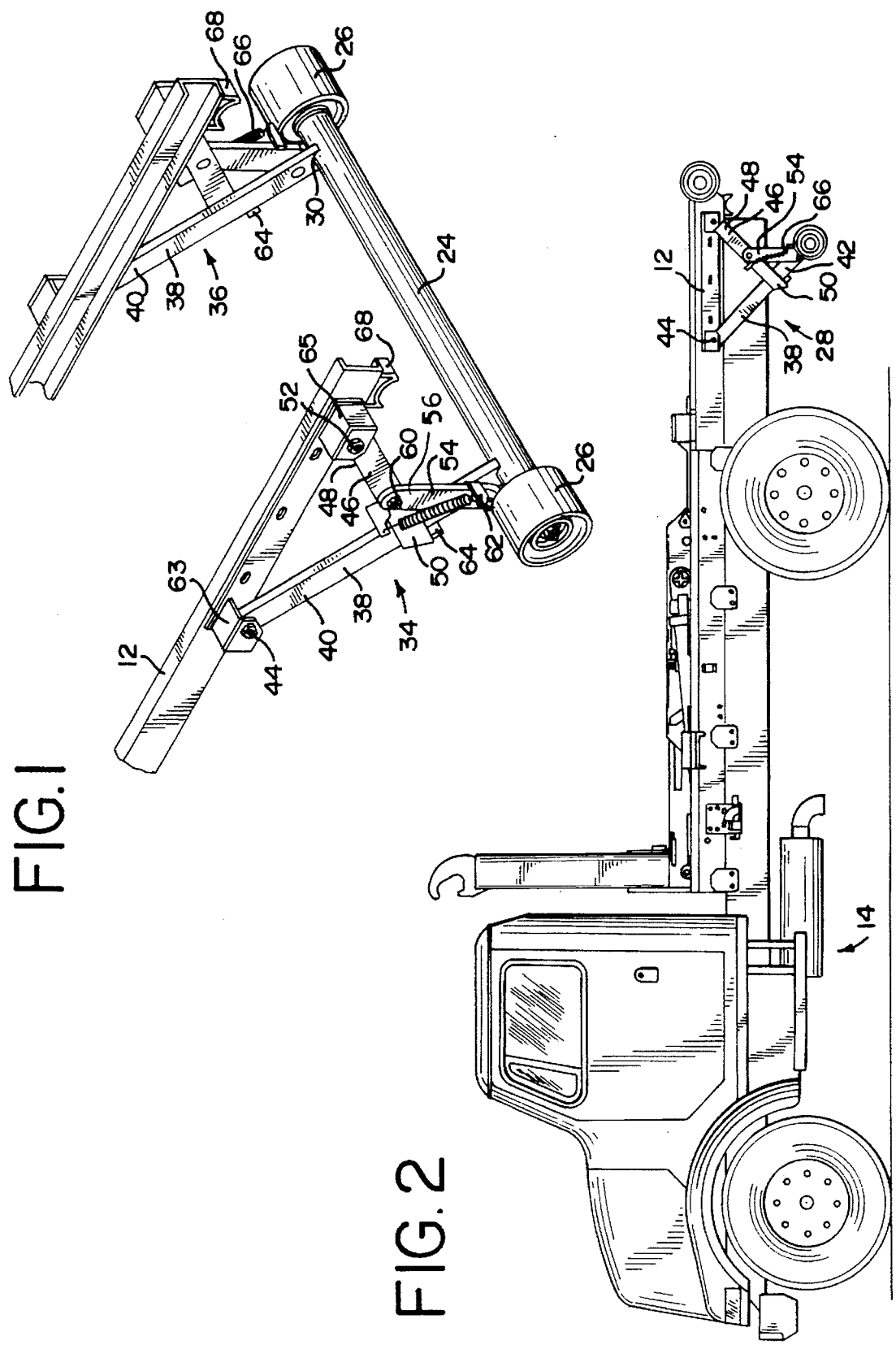

DROP DOWN BUMPER

BACKGROUND OF THE INVENTION

1. Field of the Invention

The invention relates generally to truck rear bumpers, and more specifically to a drop down bumper for attachment to the rear of a truck or to a container transported on trucks.

2. Background of the Prior Art

Trucks in common use for transporting articles and materials often have beds which are at a high level relative to passenger cars. In an accident situation where a car or other small vehicle strikes a truck from the rear, the car can submarine or ride under the rear structure of the truck with the result that the passenger compartment may collide with the bed or other rear structure. It has become common, accordingly, to provide a bumper extended below the rear structure of the truck that will contact the front bumper or other part of the front end of a passenger car and thus help prevent penetration of the passenger compartment.

Fixed rear truck bumpers, however, may hinder access to the rear portions of the truck. Some trucks have load carrying structures which may be tilted and lowered to a position at or near ground level to ease loading. On such a truck, fixed bumpers are a hindrance that can interfere with the complete lowering of the structure. Adjustable rear bumpers which slide along channels or slots can become jammed and difficult to adjust. Existing adjustable bumpers require an additional step to adjust the bumper, or they fit only on trucks with certain tilting mechanisms.

Trucks often transport large containers. A typical example is a garbage dumpster from a construction site. When a container loaded on a truck for transportation extends beyond the rear of the truck, a bumper attached to the truck can be too far from the edge of the container to prevent cars or other small vehicles from riding under the container.

One method of loading the containers on to the trucks is to lift and pull one end of the container. The end not being lifted slides along the ground a distance before being lifted onto the truck. Similarly, when the containers are unloaded, one end must slide along the ground. It is advantageous for the end that slides to be equipped with rollers to reduce the wear and tear on the container, to aid in loading and unloading the containers, and to make it more convenient to move the container once it has been unloaded. The same end that slides along the ground during loading and unloading is the end that overhangs and prevents the truck's bumper from working properly.

For the foregoing reasons there is a need for a folding drop down bumper which has rollers and is suitable for attachment to a truck or a container.

SUMMARY OF THE INVENTION

The present invention consists of a drop down bumper suitable for attachment to a frame of a truck or of a container. A drop down bumper having the features of the present invention comprises an impact protection bar, including a pair of attached loading rollers, that is mounted at the rear of a truck by a linkage that is movable between a folded position and an extended position. When the linkage is in the folded position, the impact protection bar is substantially proximate to the truck frame. When the linkage is in the extended position, the impact protection bar is moved a distance away from the frame such that when a car or other small vehicle approaches the frame, the bumper or other front end structure of the car will strike the impact protection bar before the car's occupant compartment rides under the frame. The drop daown bumper is particularly suited for use on trucks adapted to load and unload independent containers, wherein the loading rollers provide rolling support for the container when it is not loaded on the truck and aid in loading and unloading containers from the truck. When the bumper is attached to a truck with a tiltable bed, the loading rollers allow the bumper to roll and fold out of the way without requiring a separate step to adjust the bumper.

It is an object of the present invention to provide a bumper that will help prevent cars or other small vehicles from riding under the rear of a truck or a container being carded on a truck.

It is an object of the present invention to provide an adjustable bumper that is compatible with a wide variety of tilting truck beds.

It is an object of this invention to provide a bumper that will aid in the loading and unloading of containers on and off trucks.

It is a further object of this invention to improve the ease with which containers can be moved, once the containers are unloaded.

These and other objects of the invention will be made apparent to one of skill in the art upon a review and understanding of this specification, the associated drawings, and the appended claims.

BRIEF DESCRIPTION OF THE DRAWINGS

FIG. 1 is a perspective view of the drop down bumper of the present invention attached to a frame of a truck, wherein the drop down bumper is shown in an extended position thereof.

FIG. 2 is a side elevational view of drop down bumper of the present invention attached to truck.

DETAILED DESCRIPTION OF A PREFERRED EMBODIMENT

Figure 3:
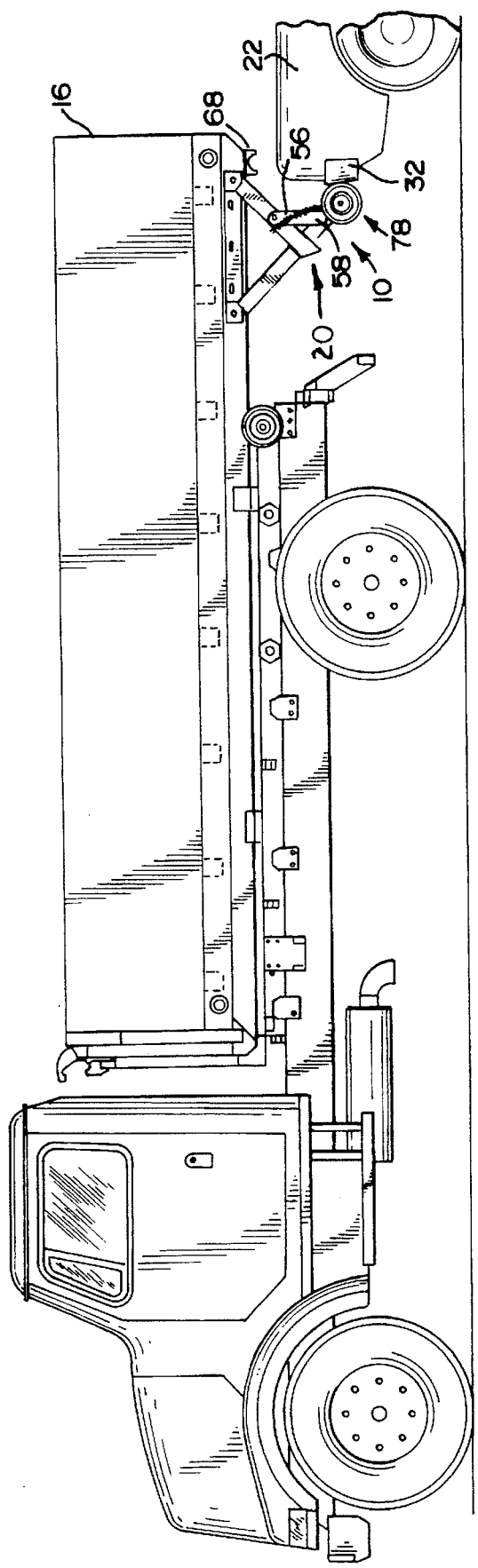
FIG. 3 is a side elevational view of drop down bumper attached to a container that is loaded on a truck.

With reference to the drawings, a preferred embodiment of the drop down bumper 10 is shown in FIGS. 1, 2, and 3. The present invention consists of a drop down bumper 10 suitable for attachment to a frame 12. The frame 12 may be a portion of a truck 14 or of a container 16 that is suitable for being loaded on a truck 14. The drop down bumper 10 is adjustable between a folded position 18 and an extended position 20. When the drop down bumper 10 is in the folded position 18, it allows access to a rear portion of the truck 14 to which it is mounted, or provides rolling support for a container 16 to which it is attached. In the extended position 20, the drop down bumper 10 helps prevent cars 22 from riding under the frame 12 during a rear-end collision.

The drop down bumper 10 comprises an impact protection bar 24 and a pair of loading rollers 26 attached at either end of the impact protection bar 24. A linkage 28 is attached to the frame 12, and is attached to the impact protection bar 24 by weldments or the like at 30. The linkage 28 is movable between a folded position 18 and an extended position 20. In the folded position 18 of the linkage 28, the impact protection bar 24 is substantially proximate to the frame 12. When the linkage 28 is in the extended position 20, the impact protection bar 24 is moved an appropriate distance from the frame 12 such that when a car 22, or other small vehicle, strikes the truck 14, or container 16 loaded on the truck 14, from behind, the car's bumper 32 or other portion of the front end of the car will strike the impact protection bar 24 before the car 22 rides under the truck 14 or container 16.

The impact protection bar 24 is a substantially rigid member, suited to withstand minor collisions without permanently deforming. The loading rollers 26 are rollers which are capable of providing rolling support for the rear portion of the container 16. In the preferred embodiment, the means 30 for attaching the impact protection bar 24 to the linkage 28 is a weld.

As shown in FIG. 1, the preferred embodiment of the linkage 28 comprises a first linkage sub-assembly 34 and a similar second linkage sub-assembly 36. Each linkage sub-assembly 34 and 36 comprises a first pivoting arm 38 having a constrained end portion 40 and a free end portion 42 (FIG. 2). A pin 44 is provided for pivotally attaching the constrained end portion 40 of the first pivoting arm to the frame 12. A second pivoting arm 46 has a constrained end portion 48 and a free end portion 50. A pin 52 is provided for pivotally attaching the constrained end portion 48 of the second pivoting arm to the frame 12. A support arm 54 (FIGS. 1 and 2) includes a first end portion 56 (FIGS. 1 and 3) and a second end portion 58 (FIG. 3). The first end portion 56 of the support arm 54 is pivotally attached to the second pivoting arm 46 by a pin 60, and the second end portion 58 of the support arm 54 is pivotally attached to the first; pivoting arm 38 by a pin 62. The first pivoting arms 38, the second pivoting arms 46, and the support arms 54 are substantially rigid members.

In the preferred embodiment, an angle 63 is fixed to the frame 12 (FIG. 1). The pin 44 runs between a hole in the angle 63 and a hole in the constrained end portion 40 of the first pivoting arm 38. An angle 65 for the second pivoting arm 46 is fixed to the frame 12 rearward from where the angle 63 for the first pivoting arm 38 is fixed to the frame 12. The pin 62 for pivotally fastening the support arm 54 to the first pivoting arm 38 runs between a hole proximate to the second end portion 58 of the support arm 54 and a hole proximate to the free end portion 42 of the first pivoting arm 38. The pin 60 for pivotally fastening the support arm 54 to the second pivoting arm 46 runs between a hole proximate to the first end portion 56 of the support arm 54 and a hole at an intermediate point in the second pivoting arm 46.

Each linkage sub-assembly 34 and 36 further preferably includes a substantially rigid arm stop 64 attached to the first pivoting arm 38. In the preferred embodiment, each linkage sub-assembly 34 and 36 also comprises a spring 66 which serves as a means for urging the linkage 28 into the extended position 20. The spring 66 may be an over-center spring 66 which also urges the linkage 28 into the folded position 18. A pair of bearings 68 attached to the frame 12 are also present in the preferred embodiment.

The impact protection bar 24 swings through an arc having an axis that passes through the points where the constrained end portion of the pivoting arms are attached to the frame 12. The limits of the arc are defined by the beatings 68 and the arm stops 64. When the linkage 28 is in the folded position 18, the impact protection bar 24 is in contact with the beatings 68 and cannot move any closer to the frame 12. When the linkage 28 is in the extended position 20, the pivoting arms rest against the arm stops 64, and the impact protection bar 24 cannot swing any further away from the frame 12.

In the preferred embodiment, an over-center spring 66 mounted between the second pivoting arm 46 and the support arm 54 in each linkage sub-assembly 34 and 36 urges the linkage 28 into both the folded position 18 and the extended position 20. When the linkage 28 is in the folded position 18, the spring 66 is in tension and tends to pull the free end portion 42 of the first pivoting arm 38 towards a point on the support arm 54 that is frameward from where the support arm 54 is fastened to the first pivoting arm 38. The linkage 28 is thereby urged towards the folded position 18. As the impact protection bar 24 is moved away from the frame 12, the spring 66 swings across the point where the support arm 54 is fastened to the first pivoting arm, and begins urging the free end portion 42 of the first pivoting arm in a direction away from the frame 12. The linkage 28 is thereby urged towards the extended position 20.

When the frame 12 is part of a container 16 (FIGS. 3, 4, and 5), the drop down bumper 10 is mounted such that when the linkage 28 is in the folded position 18 (FIG. 4), the impact protection bar 24 is substantially proximate to the frame 12 and in contact with the beatings 68. When the linkage 28 is in the folded position 18, the loading rollers 26 provide rolling support for the container 16 when it is resting on any substantially solid, substantially even surface 70. The linkage 28 can be moved from the folded position 18 to the extended position 20 by moving the impact protection bar 24 in a direction opposite from the container 16, for example by the action of gravity when the rollers 26 are unsupported. When the linkage 28 is in the extended position 20, the impact protection bar 24 is at a distance below the frame 12 such that when the container 16 is loaded onto a truck 14 which the container 16 overhangs, the impact protection bar 24 will be the initial impact site of cars 22 and other small vehicles when approaching the truck 14 from the rear. The drop down bumper 10 will help prevent the car 22 or small vehicle from riding under the container 16.

Figure 5:
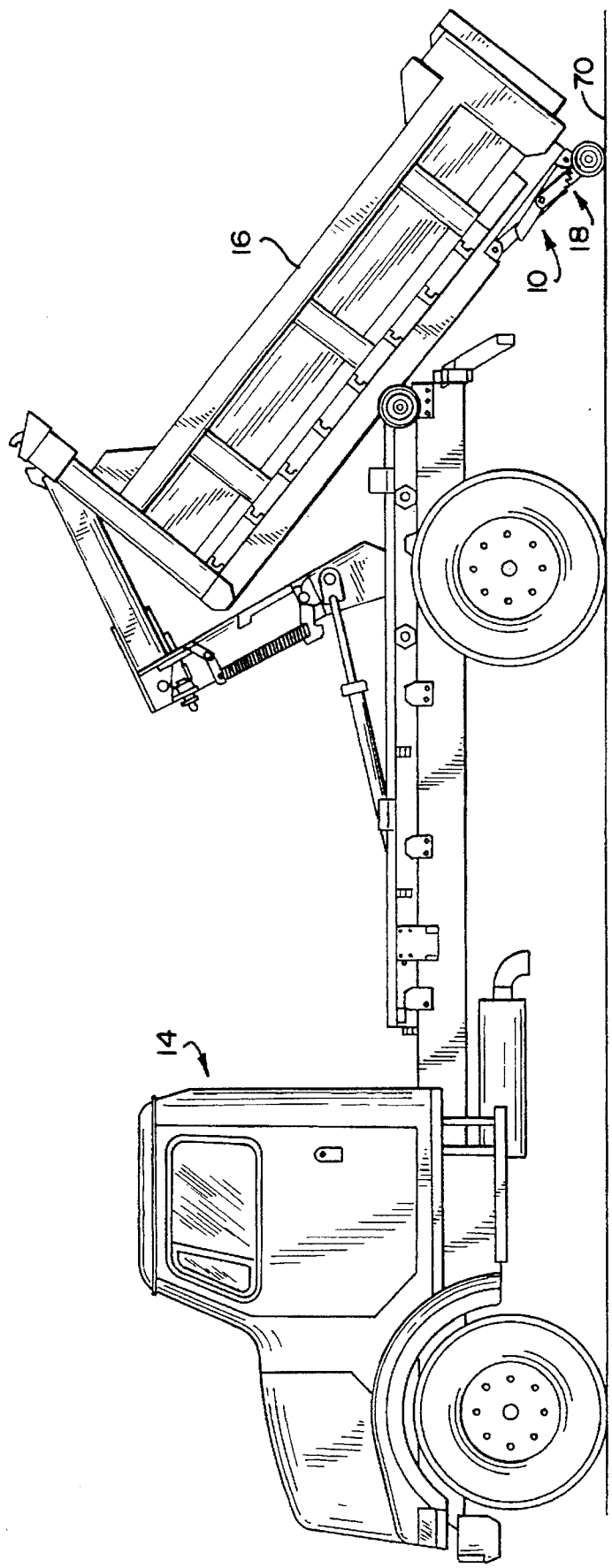
FIG. 5 is a side elevational view of the container of FIG. 4 being loaded on to a truck.

The loading of a container 16 with an attached drop down bumper 10 is shown in FIG. 5. As one end of the container 16 is lifted on to the truck 14, the end which has the drop down bumper 10 attached translates across the surface 70 on which it is resting, towards the truck 14. The rollers 26 allow the trailing end of the container 16 to roll across the surface 70. Without the rollers 26, the end of the container 16 would drag across the surface 70. By rolling instead of dragging, the force needed to pull the container 16 onto the truck 14 is decreased, the wear and tear on the container 16 is reduced, and the surface 70 on which the container 16 was resting is less likely to get marred. Once the container 16 is on the truck 14 (FIG. 3), the drop down bumper 10 can be adjusted into the extended position 20 by pulling the impact protection bar 24 in a direction opposite from the container 16.

Similarly, when the container 16 is unloaded, the rear end of the container 16 must translate across the surface 70 as the container 16 is pushed off the truck 14. The loading rollers 26 allow for rolling translation. The drop down bumper 10 can be moved into the folded position 18 by pushing the impact protection bar 24 towards the container 16, or the weight of the container 16 may be used to fold the drop down bumper 10 as the container 16 is unloaded.

When the frame 12 is part of the truck 14 (FIG. 2), the drop down bumper 10 is mounted such that when the linkage 28 is in the folded position 18, the rear underside of the truck 14 can be accessed with minimal hindrance from the drop down bumper 10. When the bumper is in the extended position 20, it will serve as the rear bumper of the truck 14.

Figure 6:
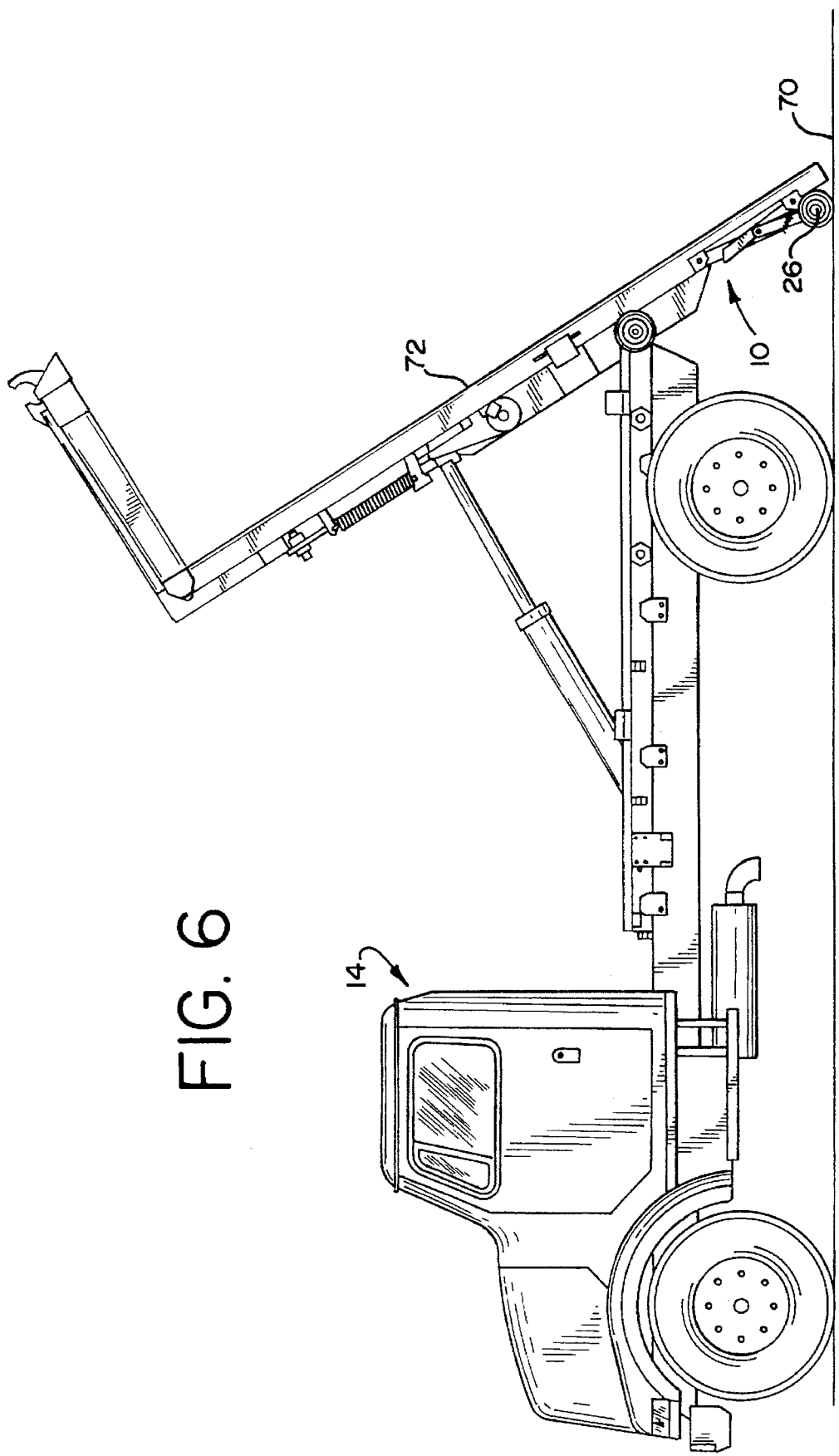
FIG. 6 is a side view of a drop down bumper attached to a truck with a tiltable bed.

In another version of the invention (FIG. 6), the drop down bumper 10 is mounted on a truck 14 with a tiltable bed 72. As the bed is tilted, the loading rollers 26 contact a surface 70 on which the truck 14 rests before the bed contacts the surface. The force of the bed tilting towards the surface 70 causes the drop down bumper 10 to move towards the folded position 18. The loading rollers 26 allow the drop down bumper 10 to fold out of the way of the tilting bed without scraping or dragging across the surface 70.

Figure 4:
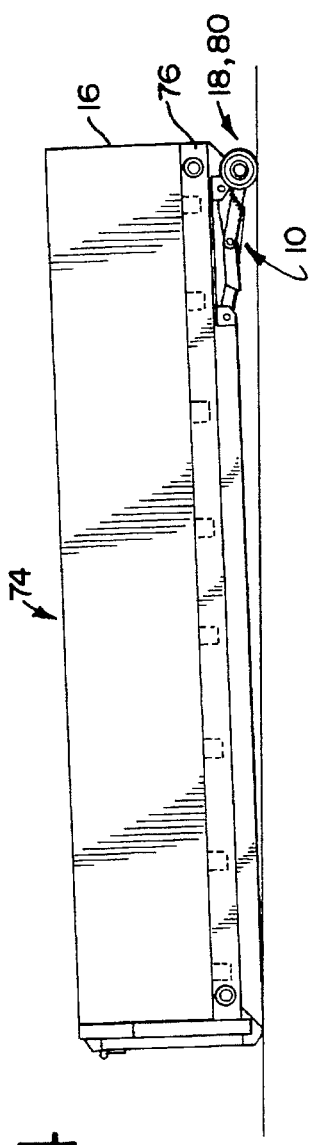
FIG. 4 is a side elevational view of the drop down bumper of FIG. 3 wherein the container is unloaded and the drop down bumper is in the folded position.

In another embodiment of the invention, the drop down bumper is part of transportable container 74. The transportable container 74 comprises a load carrying unit 76 and the drop down bumper 10. The load carrying unit 76 is a device suitable to support or restrain items that may need transporting both when the items are loaded on a truck 14, and when they are unloaded. A typical example is a garbage dumpster. When the container is loaded on a truck 14 (FIG. 3) the drop down bumper can be adjusted to a loaded extended position 78 by moving the impact protection bar 24 away from the load carrying unit 76. In the loaded extended position 78, the drop down bumper 10 prevents cars 22 and other small vehicles from riding under the transportable container 74. An unloaded, folded position 80 is used when the transportable container 74 has been removed from the truck 14 (FIG. 4). The unloaded, folded position 80 allows the transportable container 74 to sit substantially level on the ground, and with rolling support for one end of the container 74.

Although the invention has been described with respect to a preferred embodiment thereof, it is to be also understood that it is not to be so limited since changes and modifications can be made therein which are within the full intended scope of this invention as defined by the appended claims.

What is claimed is:

1. A drop down bumper for attachment to a rear portion of a frame, said drop down bumper comprising:
   (a) a transverse impact protection bar having a first end and a second end;
   (b) a first loading roller mounted to said first end of said transverse protection bar and a second loading roller mounted to said second end of said transverse protection bar;
   (c) a linkage movable between a folded position and an extended position;
   (d) means for attaching said linkage to said frame; and
   (e) means for attaching said impact protection bar to said linkage such that when said linkage is in said folded position said impact protection bar is substantially proximate to said frame, and when said linkage is in said extended position said impact protection bar is moved a distance below said frame.

2. A drop down bumper as defined in claim 1, wherein said linkage comprises a first linkage sub-assembly and a second linkage sub-assembly.

3. A drop down bumper as defined in claim 1, further comprising means for urging said linkage from an intermediate position to said extended position and to said folded position.

4. A drop down bumper as defined in claim 2, wherein each linkage sub-assembly comprises:
   (a) a first pivoting arm having a constrained end portion and a free end portion;
   (b) means for pivotally fastening said constrained end portion of said first pivoting arm to said frame;
   (c) a second pivoting arm having a constrained end portion and a free end portion;
   (d) means for pivotally fastening said constrained end portion of said second pivoting arm to said frame at a point rearward from where said first pivoting arm is fastened to said frame;
   (e) a support arm having a first end portion and a second end portion;
   (f) means for pivotally fastening said first end portion of said support arm to said second pivoting arm; and
   (g) means for pivotally fastening said second end portion of said support arm to said first pivoting arm.

5. A drop down bumper as defined in claim 4, wherein each linkage sub-assembly further comprises:
   (a) an arm stop attached to said first pivoting arm for contact therewith by said second pivoting arm when said linkage is in said extended position to prevent said linkage from unfolding past said extended position.

6. A drop down bumper as defined in claim 5, wherein said means for urging said linkage into said extended position includes a pair of off center springs, a corresponding each one of which is connected between a corresponding second pivoting arm and a corresponding support arm.

7. A drop down bumper as defined in claim 1, further comprising a pair of bearing surfaces attached to said frame such that said impact protection bar rests against said bearing surfaces when said linkage is in said folded position.

8. A drop down bumper for attachment to a rear portion of a container, said container being suitable for loading on a truck, said drop down bumper comprising:
   (a) a transverse impact protection bar having a first end and a second end;
   (b) a pair of loading rollers, one each of said loading rollers attached at a corresponding end of said impact protection bar;
   (c) a linkage movable between a folded position and an extended position;
   (d) means for attaching said linkage to said container; and
   (e) means for attaching said impact protection bar to said linkage such that when said linkage is in said folded position said impact protection bar is substantially proximate to said container and said rollers are positioned to provide rolling support for said end portion of said container when said container is not loaded on said truck, and when said linkage is in said extended position said impact protection bar is positioned from said container to provide an initial impact member.

9. A drop down bumper as defined in claim 8, wherein said linkage comprises a first linkage sub-assembly and a second linkage sub-assembly.

10. A drop down bumper as defined in claim 8, wherein said linkage further comprises means for urging said linkage both to said extended position and to said folded position.

11. A drop down bumper as defined in claim 9, wherein each linkage sub-assembly comprises:
   (a) a first pivoting arm having a constrained end portion and a free end portion;
   (b) means for pivotally fastening said constrained end portion of said first pivoting arm to said container;
   (c) a second pivoting arm having a constrained end portion and a free end portion;
   (d) means for pivotally fastening said constrained end portion of said second pivoting arm to said container at a point rearward from where said first pivoting arm is fastened to said container;
   (e) a support arm having a first end portion and a second end portion;

(f) means for pivotally fastening said first end portion of said support arm to said second pivoting arm; and (g) means for pivotally fastening said second end portion of said support arm to said first pivoting arm.

12. A drop down bumper as defined in claim 11, wherein each linkage sub-assembly further comprises:

(a) an arm stop attached to said first pivoting arm for contact therewith by said second pivoting arm when said linkage is in said extended position to prevent said linkage from unfolding past said extended position.

13. A drop down bumper as defined in claim 12, wherein said means for urging said linkage into said extended position includes a pair of off center springs, a corresponding each one of which is connected between a corresponding second pivoting arm and a corresponding support arm.

14. A drop down bumper as defined in claim 9, further comprising a pair of bearing surfaces attached to said frame such that said impact protection bar rests against said bearing surfaces when said linkage is in said folded position.

15. A transportable container comprising:

(a) a load carrying unit;

(b) an impact protection bar having a pair of rollers, one of which is mounted on a first end of said impact protection bar and the other of which is mounted and a second end of said impact protection bar;

(c) a linkage movable between an unloaded folded position and a loaded extended position, wherein said linkage includes means for attaching itself to said load carrying unit; and (d) means for attaching said impact protection bar to said linkage such that when said linkage is in said unloaded folded position said impact protection bar is substantially proximate to said load carrying unit and said rollers are positioned to provide rolling support for said end portion of said container when said container is not loaded on said truck, and when said linkage is in said loaded extended position said impact protection bar is at an appropriate distance from said load carrying unit so that when said container is loaded on a truck said impact protection bar will be struck by a smaller vehicle before it rides under said container.

16. A transportable container as defined in claim 15, wherein said linkage comprises a first linkage sub-assembly and a second linkage sub-assembly.

17. A transportable container as defined in claim 16, wherein said linkage further comprises means for urging said linkage both to said extended position and to said folded position.

18. A transportable container as defined in claim 17, wherein each linkage sub-assembly comprises:

(a) a first pivoting arm having a constrained end portion and a free end portion;

(b) means for pivotally fastening said constrained end portion of said first pivoting arm to said load carrying unit;

(c) a second pivoting arm having a constrained end portion and a free end portion;

(d) means for pivotally fastening said constrained end portion of said second pivoting arm to said container at a point rearward from where said first pivoting arm is fastened to said load carrying unit;

(e) a support arm having a first end portion and a second end portion;

(f) means for pivotally fastening said first end portion of said support arm to said second pivoting arm; and (g) means for pivotally fastening said second end portion of said support arm to said first pivoting arm.

19. The transportable container in claim 18, wherein the means for urging the linkage into the extended position includes a pair of off center springs, a corresponding each one of which is connected between a corresponding second pivoting arm and a corresponding support arm.

20. A drop down bumper suitable for attachment to a container, said container being suitable for being transported by a truck equipped with a hook lifting device, said container having a rear portion, the drop down bumper comprising:

(a) a transverse impact protection bar having opposite end portions;

(b) a pair of rollers suitable for providing rolling support for the container, one each of said rollers is attached at a corresponding one of opposite end portions of said impact protection bar;

(c) a pair of first pivoting arms, each first pivoting arm having a constrained end portion and a free end portion;

(d) means for pivotally attaching said constrained end portion of each of said first pivoting arms to the container such that said first pivoting arms pivot longitudinally of the container;

(e) means for attaching said impact protection bar to said first pivoting arms at said free end portion of each first pivoting arm such that said impact protection bar is transverse to the container;

(f) a pair of second pivoting arms, each second pivoting arm being shorter than said first pivoting arms, and each second pivoting arm having a constrained end portion and a free end portion;

(g) means for pivotally attaching said constrained end portion of each second pivoting arm to the container at points rearward from where said first pivoting arms attach to the container, such that said second pivoting arms pivot longitudinally of the container;

(h) a pair of support arms, each support arm being shorter than said second pivoting arms, and each support arm having a first end portion and a second end portion;

(i) means for pivotally attaching said first end portion of each of said support arms to a point proximate to a midpoint on a corresponding second pivoting arm, such that each support arm pivots longitudinally to the container;

(j) means for pivotally attaching said second end portion of each of said support arms to a point proximate to said free end portion of each first pivoting arm;

(k) a pair of arm stops; and (l) means for connecting each arm stop to a corresponding one of said first pivoting arms, such that when said free end portion of said second pivoting arms are moved from positions substantially proximate to the container to positions groundward from the container, said second pivoting arms come into contact with said arm stops and are prevented from pivoting further groundward to define a position of said impact protection bar below the container so that when the container is loaded on a truck said impact protection bar will be struck by a smaller vehicle before it rides under the rear of the truck.

* * * * *